(12) United States Patent
Bazer-Bachi et al.

(10) Patent No.: US 11,241,667 B2
(45) Date of Patent: *Feb. 8, 2022

(54) METHOD FOR PREPARING SOLIDS FROM A MIXTURE OF AT LEAST ONE MALACHITE POWDER AND AN OXIDE POWDER AND THE USE OF SAID SOLIDS

(71) Applicants: AXENS, Rueil Malmaison (FR); IFP Energies Nouvelles, Rueil-Malmaison (FR)

(72) Inventors: Delphine Bazer-Bachi, Saint Privat des Vieux (FR); David Chiche, Lyons (FR); Joseph Lopez, Saint Julien les Rosiers (FR); Thomas Serres, Langlade (FR); Tom Frising, Nanterre (FR); Olivier Ducreux, Louveciennes (FR); Patrick Euzen, Paris (FR)

(73) Assignees: AXENS, Rueil Malmaison (FR); IFP Energies Nouvelles, Rueil-Malmaison (FR)

( * ) Notice: Subject to any disclaimer, the term of this patent is extended or adjusted under 35 U.S.C. 154(b) by 547 days.

This patent is subject to a terminal disclaimer.

(21) Appl. No.: 16/005,907

(22) Filed: Jun. 12, 2018

(65) Prior Publication Data

US 2018/0353929 A1 Dec. 13, 2018

(30) Foreign Application Priority Data

Jun. 13, 2017 (FR) ...................................... 1755302

(51) Int. Cl.
*B01J 20/02* (2006.01)
*B01J 20/06* (2006.01)
(Continued)

(52) U.S. Cl.
CPC .......... *B01J 20/0237* (2013.01); *B01D 53/02* (2013.01); *B01D 53/48* (2013.01); *B01D 53/52* (2013.01);
(Continued)

(58) Field of Classification Search
CPC .... B01J 23/72; B01J 20/0237; B01J 20/0277; B01J 20/06; B01J 20/3014; B01J 20/3007;
(Continued)

(56) References Cited

U.S. PATENT DOCUMENTS 5,853,681 A * 12/1998 Denny ................ B01J 20/3028
423/225
9,156,738 B2 10/2015 Bazer-Bachi et al.
(Continued)

FOREIGN PATENT DOCUMENTS

FR 2940967 A1 7/2010
GB 2493046 A 1/2013
WO 03/062177 A1 7/2003

OTHER PUBLICATIONS

WO2008/020250—Cousins—see machine translation pdf file, published in 2008.*
(Continued)

*Primary Examiner* — Bryan D. Ripa
*Assistant Examiner* — Smita S Patel
(74) *Attorney, Agent, or Firm* — Millen White Zelano & Branigan; Csaba Henter

(57) ABSTRACT

The invention relates to a method for preparing a solid comprising the mixture of a set of compounds comprising at least one $Cu_2(OH)_2CO_3$ powder, one metal oxide powder selected from the group of metals consisting of copper, zinc,
(Continued)

iron, manganese and mixtures thereof, and at least one binder as well as the use of the solid prepared by means of this method.

15 Claims, 1 Drawing Sheet

(51) Int. Cl.
*B01J 20/30* (2006.01)
*B01D 53/52* (2006.01)
*B01J 20/28* (2006.01)
*B01D 53/48* (2006.01)
*C10L 3/10* (2006.01)
*B01D 53/02* (2006.01)

(52) U.S. Cl.
CPC .......... *B01J 20/0277* (2013.01); *B01J 20/06* (2013.01); *B01J 20/2803* (2013.01); *B01J 20/28011* (2013.01); *B01J 20/3007* (2013.01); *B01J 20/3014* (2013.01); *B01J 20/3042* (2013.01); *B01J 20/3078* (2013.01); *B01J 20/3085* (2013.01); *C10L 3/103* (2013.01); *B01D 2253/112* (2013.01); *B01D 2257/30* (2013.01); *B01D 2257/304* (2013.01); *B01D 2257/306* (2013.01); *B01D 2257/308* (2013.01); *B01D 2257/502* (2013.01); *B01D 2257/553* (2013.01); *B01D 2258/05* (2013.01); *B01J 2220/42* (2013.01); *C10L 2290/542* (2013.01)

(58) Field of Classification Search
CPC .... B01J 20/3078; B01J 20/3085; B01J 20/02; B01J 2220/42; B01J 2220/28004; B01J 2220/28059; B01J 2220/28071; B01D 53/52; B01D 53/02; B01D 53/48; B01D 53/82; B01D 2257/304; B01D 2257/308; B01D 2257/306; B01D 2257/502; B01D 2257/30; B01D 2257/553; B01D 2253/311; B01D 2253/304; B01D 2253/1124; B01D 2253/25; B01D 2253/306; B01D 2253/112; C04B 2235/5436; C04B 2235/442; C04B 2235/5472; C04B 2235/3217; C04B 2235/349; C04B 2235/6021; C04B 2235/3418; C10L 3/103
See application file for complete search history.

(56) References Cited

U.S. PATENT DOCUMENTS

| | | |
|---|---|---|
| 9,539,536 B2 | 1/2017 | MacLeod et al. |
| 2012/0000855 A1 | 1/2012 | Bazer-Bachi et al. |
| 2014/0161701 A1 | 6/2014 | MacLeod et al. |
| 2017/0072381 A1 | 3/2017 | MacLeod et al. |

OTHER PUBLICATIONS

Search Report dated Mar. 8, 2018 issued in corresponding FR 1755302 application (2 pages).

* cited by examiner

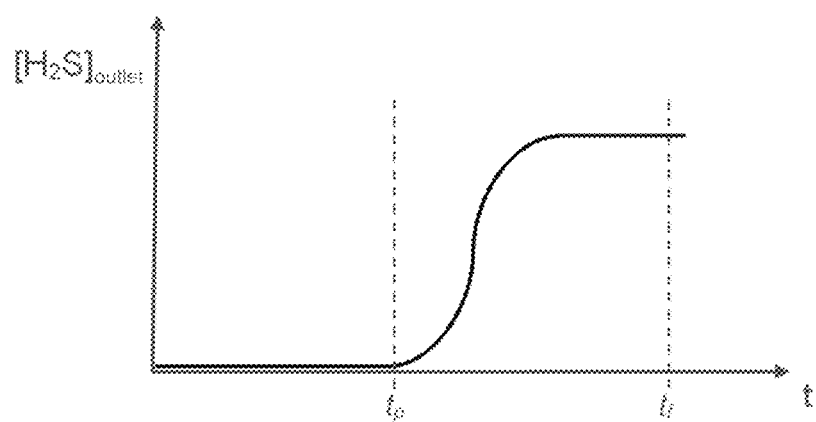

METHOD FOR PREPARING SOLIDS FROM A MIXTURE OF AT LEAST ONE MALACHITE POWDER AND AN OXIDE POWDER AND THE USE OF SAID SOLIDS

FIELD OF THE INVENTION

The invention relates to a method for the preparation of solids based on copper compounds, as well as to the use of said solids for, inter alia, the removal of sulphur compounds from gaseous or liquid feedstocks, such as natural gases, biogas, synthesis gases, gases containing carbon dioxide $CO_2$, or liquid hydrocarbons.

The solids prepared according to the invention may also be used for the removal of carbon monoxide CO, compounds containing mercury, or compounds containing arsenic in gas or liquid feedstocks, as well as for the catalysis of the Dussan reaction (water-gas shift reaction).

PRIOR ART

Copper compounds are known from the prior art for their ability to react with sulphur compounds.

The use of copper hydroxycarbonate as an active phase is of particular interest because the reaction with $H_2S$ seems to be particularly fast.

Many documents address desulphurisation in the presence of copper oxide.

U.S. Pat. No. 7,837,964 describes a desulphurisation material that may comprise up to 99.8 wt % of copper oxide. The material is prepared by precipitation.

U.S. Pat. No. 4,582,819 describes a method for the desulphurisation of liquid hydrocarbons using solids prepared from copper hydroxycarbonate and alumina. The precursors are not peptized. The solid is thermally-treated, which partially degrades the copper hydroxycarbonate in order to obtain CuO, at a temperature above 260° C.

US 2013/047850 describes a method for the purification of synthesis gas ($H_2$, CO) using CuO-based solids, developed according to a method which makes it possible to prevent or mitigate the reduction of CuO during the industrial implementation of synthesis gas. For this purpose, the solids are prepared from copper hydroxycarbonate and a halogenated additive, for example NaCl, and a calcination step at a temperature of between 280 and 500° C. in order to completely decompose the copper carbonate into CuO.

Documents U.S. Pat. No. 6,007,706 and EP 243052 describe the removal of sulphur compounds by using a solid comprising at least 70 wt % of a copper compound (carbonate or oxides or other).

However, none of said documents addresses the problem of the mechanical strength of the prepared materials.

The document FR 2940967 describes the preparation of a ZnO-based solid and the use thereof for the desulphurisation of liquid or gaseous feedstocks, said solid having excellent mechanical strength and an increased storage capacity. The preparation method comprises the steps of mixing ZnO powders, peptization and calcination. According to said document, the basic peptization of ZnO allows for a partial dissolution of ZnO in a basic medium, which results in a reduction of the size of the particles, a densified solid through better dispersion and therefore an increase in the mechanical strength.

However, malachite, which has the composition $Cu_2(OH)_2CO_3$, is a basic compound which is not soluble in a basic medium, but is soluble in an acidic medium. Therefore, basic peptization does not have a solubilisation effect which could lead to a decrease in particle sizes and, ultimately, to an improvement in the mechanical strength as described in FR 2940967.

Document WO 95/24962 describes capture masses containing at least 75 wt % of copper carbonate, hydroxycarbonate or hydroxide. The text also relates to obtaining solids having a loading density of at least 0.9 kg/l, or even 1.2 kg/l, in order to improve the volume capture capacity of the solids (i.e. the amount of sulphur captured relative to the volume of the solid and not to the mass thereof). Said document indicates that the drying/calcination temperature should not exceed 150° C., or even 115° C., in order not to decompose the copper compounds used. This makes it possible to count the $CO_2$ and/or the water contained in the solids in the form of carbonate and hydroxide which thus contribute to the increase in density. Above 150° C., the decomposition of copper carbonate, hydroxycarbonate or hydroxide results in a decrease in the loading density of the solids. Moreover, said document does not describe a peptization step.

However, solids prepared solely from copper hydroxycarbonate have particularly low mechanical strength properties, even after being thermally-treated, which makes them difficult to use, having, in particular, problems with attrition and the production of fine particles.

The method according to the invention makes it possible to obtain solids which have both increased mechanical strength properties and effective sulphur capture capacities greater than those of the solids of the prior art.

BRIEF DESCRIPTION OF THE INVENTION

The invention relates to a method for preparing a solid, comprising the steps of:

a) mixing of a set of compounds comprising at least one $Cu_2(OH)_2CO_3$ powder, one metal oxide powder selected from the group of metals consisting of copper, zinc, iron, manganese and mixtures thereof, and at least one binder;

b) contacting the mixture of step a) with an aqueous solution and kneading the paste thus obtained;

c) extruding the paste kneaded in step b) at a pressure of between 3 and 25 MPa;

d) calcinating the extrudates at a temperature of between 140° C. and 500° C. and for a duration of between 10 minutes and 6 hours under a gaseous flow comprising oxygen.

As well as very good mechanical strength, the adsorbents obtained have an optimised density and porosity, making it possible to maximise the useful mass capacity thereof while reducing the dispersion front during the capturing of the sulphur.

DETAILED DESCRIPTION OF THE INVENTION

In the rest of the description, the term solid prepared according to the invention is also understood to mean, without limitation, an adsorbent as well as a catalyst or capture mass depending on the use of said solid.

In the rest of the description, the terms malachite, copper hydroxycarbonate and $Cu_2(OH)_2CO_3$ are used without distinction.

Loss on ignition (LOI) of the solid is understood to be the loss of weight in wt % of a sample of solid submitted to calcination at 550° C. for 2 hours.

Powder is understood to be a set of particles.

In the rest of the description, the size distribution of a powder or of particles is measured by granulometry by laser diffraction, based on the Mie scattering theory (G. B. J. de Boer, C. de Weerd, D. Thoenes, H. W. J. Goossens, Part. Charact. 4 (1987) 14-19). The distribution of the particle size of the said powder or said particles is represented by the median diameter ($D_{50}$), defined as being the diameter of the equivalent sphere such that 50 vol % of the said particles or the constituent particles of the said powder is smaller than the said diameter.

In the following, specific surface area can be understood as the BET specific surface area determined by the adsorption of nitrogen conforming to the ASTM D 3663-78 standard established from the BRUNAUER-EMMETT-TELLER method described in "The Journal of American Society", 60, 309, (1938).

Step a) Mixing

According to the invention, the preparation method comprises a step a) of mixing of a set of compounds comprising at least one $Cu_2(OH)_2CO_3$ powder, one metal oxide powder selected from the group of metals consisting of copper, zinc, iron, manganese and mixtures thereof, and at least one binder.

In a variant of the method according to the invention, the said metal oxide is advantageously copper oxide with the formula CuO. In this variant, the said compound is advantageously free from zinc oxide.

According to another variant of the method according to the invention, the said metal oxide is advantageously zinc oxide ZnO. In this variant, the said compound is advantageously free from copper oxide powder.

According to a preferred variant according to the invention, the said set of compounds comprises a copper oxide CuO powder and a zinc oxide ZnO powder.

The set of compounds is advantageously mixed dry in step a), i.e. without the addition of liquid. The said step a) may be implemented, for example, in an agitator or any other type of mixer. The step makes it possible to obtain a homogeneous mixture of the powdered constituents.

In a preferred arrangement of the method according to the invention where the said set of compounds comprises a CuO powder, the CuO powder being advantageously obtained by partial decomposition of one or a plurality of $Cu_2(OH)_2CO_3$ powders. This partial decomposition may be carried out, for example, by means of thermal treatment of one or a plurality of $Cu_2(OH)_2CO_3$ powders or of the set of compounds of step a) at temperatures between 100 and 300° C., preferably between 150 and 300° C., preferably between 200 and 300° C., for between 1 and 12 hours. It results in the transformation of a fraction of the $Cu_2(OH)_2CO_3$ powder to CuO powder, the transformed fraction being dependent on the duration and temperature of the thermal treatment.

In a preferred arrangement of the method according to the invention where the said set of compounds comprises a CuO powder, the median diameter of the mixture of $Cu_2(OH)_2CO_3$ powder and CuO powder ($D_{50}$), being less than 45 μm.

The metal oxide powder content, said metal oxide being selected from the group of metals consisting of copper, zinc, iron, manganese and mixtures thereof introduced into the set of compounds mixed in step a) is expressed as the ratio of the metal oxide(s) powder mass introduced into the set of compounds mixed in step a) to the total mass of malachite and metal oxide(s) powder(s) introduced into the set of compounds mixed in step a) or, in other words, as the ratio (amount of metal oxide powder(s) selected from the group of metals consisting of copper, zinc, iron, manganese and mixtures thereof introduced into the set of compounds mixed in step a))/(amount of metal oxide powder(s) selected from the group of metals consisting of copper, zinc, iron, manganese and mixtures thereof and $Cu_2(OH)_2CO_3$ introduced into the set of compounds mixed in step a)). This ratio is between 0.01 and 1, preferably between 0.05 and 1, preferably between 0.05 and 0.95, preferably between 0.05 and 0.7, preferably between 0.1 and 0.6.

Sources of $Cu_2(OH)_2CO_3$

The $Cu_2(OH)_2CO_3$ powder comes from any source known to the person skilled in the art. The median diameter ($D_{50}$) is advantageously between 1 and 100 μm, preferably between 4 and 80 μm, preferably between 4 and 50 μm. In a particular arrangement, the said set of compounds comprises only one malachite powder, the median diameter of which being between 1 and 100 μm, preferably between 4 and 80 μm, preferably between 4 and 50 μm.

In a particular arrangement, the $Cu_2(OH)_2CO_3$ powder advantageously has a bimodal distribution. The said malachite powder comprises 0.1 to 99.9 wt %, advantageously 2 to 99.9 wt %, preferably 5 to 99.9 wt %, very preferably 5 to 99 wt %, preferably 5 to 90 wt % and very preferably 5 to 85 wt % of malachite particles, the $D_{50}$ of which is between 1 and 15 μm, preferably between 1 and 10 μm and very preferably between 4 and 9 μm, and 99.9 to 0.1 wt %, advantageously 98 to 0.1 wt %, preferably 95 to 0.1 wt %, very preferably 95 to 1 wt %, preferably 95 to 10 wt % and very preferably 95 to 15 wt % of malachite particles, the $D_{50}$ of which is between 25 and 100 μm, preferably between 25 and 80 μm, preferably between 30 and 50 μm, the weight percentage being expressed relatively to the total weight of malachite. A bimodal distribution improves the mechanical strength of the obtained final solid.

Alternatively, the said set of compounds comprises at least two malachite powders of different particle sizes. In this arrangement, the said set of compounds comprises 0.1 to 99.9 wt %, advantageously 2 to 99.9 wt %, preferably 5 to 99.9 wt %, very preferably 5 to 99 wt %, preferably 5 to 90 wt % and very preferably 5 to 85 wt % of a first malachite powder, the $D_{50}$ of which is between 1 and 15 μm, preferably between 1 and 10 μm and very preferably between 4 and 9 μm, and 99.9 to 0.1 wt %, advantageously 98 to 0.1 wt %, preferably 95 to 0.1 wt %, very preferably 95 to 1 wt %, preferably 95 to 10 wt % and very preferably 95 to 15 wt % of a second malachite powder, the $D_{50}$ of which is between 25 and 100 μm, preferably between 25 and 80 μm, preferably between 30 and 50 μm, the weight percentage being expressed relatively to the total weight of the malachite powders.

Source of CuO

The CuO may come from any source known to the person skilled in the art. It advantageously comes from precipitation methods, or from the calcination of CuO precursors such as malachite having the formula $Cu_2(OH)_2CO_3$.

Copper oxide powders used in the method according to the invention usually have a specific surface area of between 10 and 80 $m^2 \cdot g^{-1}$, preferably between 30 and 70 $m^2 \cdot g^{-1}$.

The median diameter ($D_{50}$) of the said powder is advantageously between 1 and 50 μm, preferably between 2 and 35 μm, advantageously between 5 and 35 μm and very advantageously between 20 and 35 μm.

The use of CuO powder in combination with $Cu_2(OH)_2CO_3$ powder for the preparation of the solid by the method according to the invention makes it possible to obtain solids having increased performance in terms of mechanical strength and capturing sulphur compounds.

Source of ZnO

ZnO powder advantageously comes from any source known to the person skilled in the art, such as the two main industrial processes for producing zinc oxide known to the person skilled in the art as the indirect process, known as the French process, and the direct process, known as the American process, described, for example, in FR 2940967.

Zinc oxide powders used in the method according to the invention usually have a specific surface area of between 10 and 80 $m^2 \cdot g^{-1}$, preferably between 30 and 60 $m^2 \cdot g^{-1}$.

ZnO powder has a median diameter ($D_{50}$) advantageously less than 60 μm, preferably less than 30 μm and very preferably less than 10 μm. In an advantageous manner, the median diameter of the ZnO powder shall be between 2 and 5 μm.

Sources of Iron and Manganese

Iron oxide powder and manganese oxide powder come from any source known to the person skilled in the art.

Iron oxide powder has a median diameter ($D_{50}$) advantageously less than 60 μm, preferably less than 30 μm and very preferably less than 10 μm. In an advantageous manner, the median diameter of the iron oxide powder shall be between 2 and 5 μm.

Manganese oxide powder has a median diameter ($D_{50}$) advantageously less than 60 μm, preferably less than 30 μm and very preferably less than 10 μm. In an advantageous manner, the median diameter of the manganese oxide powder shall be between 2 and 5 μm.

Binders

The set of compounds mixed in step a) comprises at least one binder. The said binder makes it possible to form the said adsorbent while providing good mechanical strength. The said binder is advantageously in powder form.

Any binder well known to the person skilled in the art may be used. In particular, the said binder may be advantageously selected, for example, from clays, such as kaolinite type minerals, palygorskite type minerals, and smectite clay minerals, such as montmorillonite or bentonite. The said binder can also be selected from the group consisting of alumina, a precursor of alumina, which is preferably boehmite, silica and mixtures thereof. It is absolutely possible to combine the use of binders of different types, such as an "alumina" binder and a "clay" binder, or even two clays of different types. According to a preferred embodiment for preparing the solid according to the invention, the binder is a bentonite type clay.

The amount of binder used in the preparation method according to the invention is such that the said binder represents less than 50 wt % of the solid prepared (expressed on the basis of total dry matter, i.e. after loss on ignition), and depends on the intended application.

Whether for copper compounds, metal oxide(s), or binder (s), it is quite possible to mix several sources of each compound.

When the solid prepared according to the invention is used for desulphurisation of the liquid or gas feedstock, the binder content of the said solid is preferably between 15 wt % and 25 wt % (expressed as total dry matter, i.e. after loss on ignition).

Step b) Peptization and Kneading

According to the invention, the method for preparing an adsorbent comprises a step b) of contacting the mixture of step a) with an aqueous solution and kneading the obtained paste.

This step resulting in obtaining a paste allows the constituents to be dispersed, i.e. the copper hydroxycarbonate, the metal oxide(s) that may be present, as well as the binder(s), and the constituents to be partially dissolved.

Under the action of the aqueous solution, the phenomena of dispersion and dissolution of the copper hydroxycarbonate particles, the metal oxide particle(s) that may be present and the binder particles, occurring during kneading by means of contacting different constituents are preferred.

Without wishing to be bound strictly by theory, it is, however, possible to hypothesise that a better dispersion of both copper hydroxycarbonate and metal oxide(s) that may be present and binder particles is in line with improving the mechanical strength ultimately obtained by said preparation method.

The said aqueous solution advantageously contains an acid or base peptizing agent.

The said acid peptizing agent can be nitric acid, hydrochloric acid, or any other acid known to the person skilled in the art, for example an inorganic acid, such as hydrofluoric acid, hydrobromic acid, hydrochloric acid, nitric acid, nitrous acid, sulphonic acid, sulphuric acid, perchloric acid, or even an organic mono- or di-carboxylic acid, such as acetic acid, propionic acid or butanoic acid.

In a particular arrangement of the method according to the invention, the peptization is brought about using an acid aqueous solution containing nitric acid. The ratio of $HNO_3$ mass/metal oxides mass is between 0.5 and 10, preferably between 0.5 and 6, and advantageously between 0.5 and 3.

The oxides mass is calculated as follows:

$$\text{oxides masse} = m_{oxides} + \frac{2 \cdot M_{CuO}}{M_{Cu_2(OH)_2CO_3}} \cdot m_{Cu_2(OH)_2CO_3}$$

Where $m_{oxides}$ is the oxides mass initially introduced in step a) in the form of powder of oxides of one or a plurality of metal(s) selected from the group consisting of copper, zinc, iron, manganese and a mixtures thereof, $M_{Cu2(OH)2CO3}$ is the malachite $Cu_2(OH)_2CO_3$ mass introduced in step a), $M_{CuO}$ is the molar mass of CuO (=80 g/mol), $M_{Cu2(OH)2CO3}$ is the molar mass of malachite $Cu_2(OH)_2CO_3$ (=222 g/mol).

The said basic peptizing agent can be an inorganic base such as sodium hydroxide, potassium hydroxide, aqueous ammonia, or else an organic base such as an amine or a quaternary ammonium compound, selected, for example, from alkyl-ethanol amines or alkyl-ethoxylated amines.

In a particular arrangement of the method according to the invention, peptization is carried out by means of an aqueous solution containing a basic peptizing agent, such as, preferably, a basic peptizing agent selected from the group consisting of sodium hydroxide, potassium hydroxide, aqueous ammonia, tetraethylammonium hydroxide (TEAOH), ammonium carbonate and mixtures thereof. The ratio of the basic peptizing agent mass/metal oxides mass is between 1 and 10, preferably between 2 and 8, and advantageously between 2 and 5. The oxides mass is calculated as the previous equation.

In another particular arrangement of the method according to the invention, the peptization is brought about using an aqueous solution without added acid or base, in step b). It has been observed in a surprising way that peptization with water without the addition of acid or base makes it possible to obtain a solid presenting improved adsorption performances, in particular sulphur compounds. In this particular arrangement, the aqueous solution in the said step b) is advantageously deionised water, for example with the help of an ion exchange resin.

The amount of the aqueous solution used is adjusted in order to obtain, from peptization and regardless of the variant implemented, a paste which does not flow, but which is no longer dry in order to allow the extrusion in step c) in suitable pressure conditions well known by to the person skilled in the art and depending on the extrusion equipment used.

The contacting of reagents ($Cu_2(OH)_2CO_3$, metal oxide(s), binder(s), aqueous solution) is carried out by kneading in batches or continuously.

For batch kneading, equipment such as for example agitators with Z arms, rollers or cams are known to the person skilled in the art, but any other kneading equipment can also be used.

It is conceivable, during the kneading in step b), to incorporate one or more extrusion additives, thus making it possible to improve the flow of the paste in the channel during extrusion. These additives, well known to the person skilled in the art, may be selected from mono-carboxylic aliphatic acids, alkylated aromatic compounds, sulphonic acid salts, fatty acids, polyvinylpyridine, polyvinylpyrrolidone, polyvinyl alcohol, cellulosic derivatives, for example.

These additives are generally added with a content between 0.1 wt % and 10 wt %, preferably between 0.2 wt % and 8 wt %, of the total mass of the constituents introduced into the agitator.

The duration of kneading is generally between 5 and 60 minutes, preferably between 20 and 50 minutes. The speed of rotation of the agitator arms is between 10 and 75 rotations/minute, preferably between 25 and 50 rotations/minute.

Step c) Extrusion

According to the invention, the method for preparing an adsorbent comprises a step c) of extruding the paste kneaded in step b) at a pressure of between 3 and 25 MPa.

The said step c) of extruding may be implemented in any type of extruder, for example in a piston, single-screw or twin-screw extruder. The geometry of the die, which gives its shape to the extrudates may be selected from the dies known to the person skilled in the art. These dies may, for example, be cylindrical, trefoil, quatrefoil, fluted or with slits.

The diameter of the dies is defined according to the diameter of the desired solid from the calcination step.

Step b) of contacting and kneading and step c) of extruding may advantageously be combined in the same equipment. In an example of this implementation, the kneaded paste may be directly extruded at the end of a continuous twin-screw agitator. In another example of this implementation, one or a plurality of batch agitators are connected to an extruder.

The extrudates obtained from step c) are advantageously dried at a temperature of between 70 and 160° C. for between 1 and 24 hours before being calcinated in step d). This drying may advantageously be carried out under the air or more preferably under humid air. The benefit of drying is to gently remove a part of the present volatile compounds, as direct calcination of the solid may result in the appearance of microfractures. Drying under humid air makes it possible to evaporate the said volatile compounds more slowly than drying under air.

Step d) Calcination

According to the invention, the method for preparing an adsorbent comprises a step d) of calcinating the extrudates at a temperature of between 140° C. and 500° C. and for a duration between 10 minutes and 6 hours under a gaseous flow comprising oxygen.

The said step d) of calcinating is carried out under a gaseous flow comprising oxygen. The said gaseous flow may advantageously be air, or a gaseous mixture comprising an inert gas (for example nitrogen) and oxygen. The said gaseous flow preferably comprises at least 5 vol %, preferably at least 10 vol % oxygen. The said gaseous flow also advantageously comprises water, preferably up to 3 vol % water.

The said step d) of calcination is carried out a temperature of between 140° C. and 500° C., preferably between 200° C. and 500° C., preferably between 200° C. and 350° C., for a duration of between 10 minutes and 6 hours, preferably between 10 minutes and 4 hours, preferably between 10 minutes and 3 hours, very preferably between 10 minutes and 2 hours, and very preferably between 15 minutes and 1 hour.

The calcination step makes it possible in particular to convert a fraction of malachite into copper oxide.

From step d) of calcination, the extrudates have a diameter of between 1 and 10 mm, preferably between 1 and 5 mm, and very preferably between 1.5 and 3.5 mm.

The solid according to the invention, obtained by means of extrusion, has a shape similar to a cylindrical rod. If necessary, these rods may be introduced into equipment making it possible to round their surface, such as a bezel, or any other equipment that can be used for the spheronization thereof.

The mass percentage of oxides (oxide+CuO content, CuO from the decomposition of the malachite) contained in the solid after the loss on ignition may be determined as follows:

$$\% \text{ masse oxides after } LOI = \frac{m_{oxides} + \frac{2 \cdot M_{CuO}}{M_{Cu_2(OH)_2CO_3}} \cdot m_{Cu_2(OH)_2CO_3}}{m_{binder} + m_{oxides} + \frac{2 \cdot M_{CuO}}{M_{Cu_2(OH)_2CO_3}} \cdot m_{Cu_2(OH)_2CO_3}}$$

Where $m_{oxides}$ is the oxides mass initially introduced in step a) in the form of powder of oxides of one or a plurality of metal(s) selected from the group consisting of copper, zinc, iron, manganese and a mixtures thereof, $m_{binder}$ is the mass of the binder introduced in step a), $M_{Cu2(OH)2CO3}$ is the malachite $Cu_2(OH)_2CO_3$ mass introduced in step a), $M_{CuO}$ is the molar mass of CuO (=80 g/mol), $M_{Cu2(OH)2CO3}$ is the molar mass of malachite $Cu_2(OH)_2CO_3$ (=222 g/mol).

The solid prepared according to the invention comprises at least:

- 50 to 99 wt %, preferably 60 to 95 wt %, more preferably 75 to 85 wt % equivalent in mass of CuO oxide+oxide of metallic element possibly present measured after loss on ignition at 550° C. for 2 hours, content determined according to the preceding equation.
- 1 to 50 wt %, preferably 5 to 40 wt %, more preferably 15 to 25 wt % of a binder, the mass percentage being measured after loss on ignition.

These contents in wt % are expressed relatively to total mass of the solid prepared by means of the method according to the invention, and measured after decomposition of precursors at 550° C. for 2 hours.

Properties of the Solid Obtained by Means of the Method According to the Invention The mechanical properties are determined by the grain by grain crushing test (EGG) described by the American Society for Testing and Materials (ASTM) D 6175-3 method. This consists of measuring the breaking strength of each particle of a representative sample comprising at least 50 particles. The result is weighted by the length of the extrudate. The EGG value is the average of the breaking strengths measured and reduced to the unit length of the extrudate (expressed in $daN \cdot mm^{-1}$) for all of the sample particles.

In the case of solids prepared according to the invention, the EGG value is greater than $0.7$ $daN \cdot mm^{-1}$ (decanewton per millimetre of length of the extrudate), preferably greater than $0.9$ $daN \cdot mm^{-1}$, and regardless of the copper hydroxycarbonate content used.

Moreover, the obtained solids used as adsorbents have improved desulphurisation performances with respect to the treatment of gases and liquids containing sulphur compounds, in particular $H_2S$, mercaptans, COS and $CS_2$.

The invention also relates to the use of the solid prepared by means of the method according to the invention.

The solid prepared according to the invention may be used to purify gaseous feedstocks, such as, for example, gaseous hydrocarbons, such as natural gases, biogases, gases containing carbon dioxide $CO_2$, or synthesis gases, such as those used in cogeneration plants, in chemical synthesis units, such as methanol synthesis or Fischer-Tropsch synthesis units, or liquids, such as hydrocarbons used as feedstocks in catalytic reforming, isomerisation, or hydrogenation units.

The solid prepared according to the invention is advantageously used to purify any gaseous or liquid feedstock containing, inter alia, sulphur compounds, such as $H_2S$, COS and/or $CS_2$, and/or mercaptans, at a pressure of between 0.1 and 25 MPa, preferably between 0.1 and 15 MPa, and a temperature of between 0 and 450° C., preferably between 15 and 300° C., preferably between 15 and 250° C.

In particular, the solid prepared according to the invention may advantageously be used to purify the feedstock of a Fischer-Tropsch synthesis unit, by being used in a reactor operating at a pressure of between 0.1 and 15 MPa, preferably between 1.5 and 5.0 MPa, at a temperature of between 0 and 400° C., preferably between 0 and 220° C., preferably between 15 and 180° C.

The said solid prepared according to the invention may also be used in order to remove some heteroelements, such as phosphorus or compounds thereof, such as phosphine $PH_3$, and/or chlorine, in particular in the form of HCl, present in the liquid or gaseous effluents, preferably at a pressure of between 0.1 and 25 MPa, preferably between 1 and 15 MPa, and at a temperature of between 0 and 200° C.

The said solid prepared according to the invention may also be used in order to remove heavy metals, such as mercury, and/or arsenic or compounds thereof, such as arsine $AsH_3$, present in the liquid or gaseous effluents, preferably at a pressure of between 0.1 and 25 MPa, preferably between 1 and 15 MPa, and at a temperature of between 0 and 200° C.

Indeed, if the feedstock to be purified contains mercury in addition to sulphur compounds, the said solid prepared by means of the method according to the invention also makes it possible to remove the mercury present in the feedstock to be treated.

The solid prepared according to the invention may advantageously undergo a step of sulphurisation before its industrial implementation in a method for capturing mercury if the feedstock to be treated does not contain sulphur compounds.

The solid prepared according to the invention may also be used in order to remove carbon monoxide CO present in the liquid or gaseous effluents, at a temperature of between 0 and 200° C. and at a pressure of between 0.1 and 25 MPa.

The solid prepared according to the invention is used by contacting the gaseous or liquid feedstock to be treated with the said solid in a reactor, which may be a fixed bed reactor, a radial flow reactor, or even a fluidised bed reactor.

The solid prepared according to the invention may also be reduced under a reducing atmosphere, such as a hydrogen flow, with a synthesis gas then used as a catalyst for Dussan or water-gas shift reactions, or as a catalyst for the synthesis of methanol from synthesis gas.

The typical usage conditions of the solid as a catalyst for the methanol synthesis reaction are a temperature of between 100 and 500° C., preferably between 150 and 300° C., even preferably between 220 and 280° C., and a pressure of between 0.1 and 25 MPa, preferably between 1 and 15 MPa, and even more preferably between 5 and 10 MPa.

The typical usage conditions of the solid as a catalyst for the Dussan reaction are a temperature of between 100 and 500° C., preferably between 150 and 300° C., even preferably between 180 and 250° C., and a pressure of between 0.1 and 25 MPa, preferably between 1 and 15 MPa, and even more preferably between 1.5 and 10 MPa.

BRIEF DESCRIPTION OF THE FIGURES

FIG. 1 is a schematic representation of a breakthrough curve which can be obtained according to the protocol for measuring the impurity capture capacity by the solids, described below. In FIG. 1, $t_p$ is the breakthrough time and $t_f$ is the end of the breakthrough time.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1755302, filed Jun. 13, 2017 are incorporated by reference herein.

EXAMPLES

Protocol for Measuring the Impurity Capture Capacity by the Solids Prepared

The impurity capture capacity of solids prepared by means of the method according to the invention is measured using a breakthrough test.

For the test to determine the $H_2S$ capture capacity, the test is carried out at a temperature of 50° C., at a pressure of 0.3 MPa, and with an hourly volume velocity (HVV) of 1530 $h^{-1}$. Hourly volume velocity can be understood as the ratio of the volumetric flow rate of gas measured at 0° C. and 1 atm to the volume of the solid tested. The gas used for the test contains 0.9 vol % $H_2S$ in nitrogen. The $H_2S$ content present in the outlet gas from the reactor containing the solid is determined by gas chromatography.

For the test to determine the methyl mercaptan $CH_3SH$ capture capacity, the test is carried out at a temperature of 50° C., at a pressure of 0.3 MPa, and with an hourly volume velocity (HVV) of 1530 $h^{-1}$. Hourly volume velocity can be understood as the ratio of the volumetric flow rate of gas measured at 0° C. and 1 atm to the volume of the solid tested. The gas used for the test contains 0.2 vol % $CH_3SH$ in nitrogen. The $CH_3SH$ content present in the outlet gas from the reactor containing the solid is determined by gas chromatography.

For the test to determine the ethyl mercaptan $C_2H_5SH$ capture capacity, the test is carried out at a temperature of 50° C., at a pressure of 0.3 MPa, and with an hourly volume velocity (HVV) of 1530 $h^{-1}$. Hourly volume velocity can be understood as the ratio of the volumetric flow rate of gas measured at 0° C. and 1 atm to the volume of the solid tested. The gas used for the test contains 0.9 vol % $C_2H_5SH$ in nitrogen. The $C_2H_5SH$ content present in the outlet gas from the reactor containing the solid is determined by gas chromatography.

For the test to determine the carbon monoxide CO capture capacity, the test is carried out at a temperature of 200° C., at a pressure of 0.1 MPa, and with an hourly volume velocity (HVV) of 2600 $h^{-1}$. Hourly volume velocity can be understood as the ratio of the volumetric flow rate of gas measured at 0° C. and 1 atm to the volume of the solid tested. The gas used for the test contains 1.8 vol % CO. The CO content present in the outlet gas from the reactor containing the solid is determined by gas chromatography.

The species i capture capacity by the solid prepared by means of the method according to the invention is determined by carrying out a material balance. The species i capture capacity, as defined within the present invention, corresponds to the amount of the species i accumulated by the solid before breakthrough (i.e. at the time $t_p$ indicated in FIG. 1, which schematically represents a breakthrough curve), this being calculated by means of the following equation:

$$q_i = M_i D_i^E \int_0^{t_p} \left(1 - \frac{C_i^S}{C_i^E}\right) dt$$

Where:
$q_i$: is the mass of the species i captured by the solid (in g),
$D_i^E$: is the inflow of the species i (in mol·min$^{-1}$),
$M_i$: is the molar mass of the species i (in g·mol$^{-1}$),
$C_i^E$: is the species i content of the inflow gas,
$C_i^S$: is the species i content at the reactor outlet,
$t_p$: is the time needed for the breakthrough of the species i (in minutes) as shown in FIG. 1.

In FIG. 1, $t_p$ is the breakthrough time and $t_f$ is the end of the breakthrough time.

The species i capture capacity of the solid tested is provided by the equation:

$$C_i = \frac{q_i}{m}$$

where m is the mass of adsorbent implemented during the test.

Example 1: According to the Prior Art

In example 1, the reference solids A1, A2, A3, A4 and A5 are prepared according to the following working method:
a) mixing a set of compounds comprising a $Cu_2(OH)_2CO_3$ powder and a binder;
b) contacting the mixture of step a) with an aqueous solution (peptization) and kneading the paste thus obtained in a Z-arm mixer for 30 minutes with an arm rotation speed of 25 rotations·minutes$^{-1}$;
c) extruding the paste kneaded in step b) by means of a piston extruder, with a diameter of 3 mm and a length of 5 to 10 mm at a variable pressure depending on the solids;
d) calcinating the extrudates at a variable temperature depending on the solids, carried out for 1 hour, under an air flow.

A bentonite clay was used as a binder.

The CuO contents or mass percentage of oxides (CuO from the decomposition of malachite) after loss on ignition (550° C. for 2 hours) are 80 wt % for solids A1, A2, A3 and A4, and 60 wt % for solid A5 (with bentonite binder as the complement). These contents are determined according to the following:

$$\% \text{ weight CuO after } LOI = \frac{\frac{2 \cdot M_{CuO}}{M_{Cu_2(OH)_2CO_3}} \cdot m_{Cu_2(OH)_2CO_3}}{m_{binder} + \frac{2 \cdot M_{CuO}}{M_{Cu_2(OH)_2CO_3}} \cdot m_{Cu_2(OH)_2CO_3}}$$

Where $m_{binder}$ is the mass of the binder introduced in step a), $M_{Cu2(OH)2CO3}$ is the mass of the $Cu_2(OH)_2CO_3$ malachite introduced in step a), $M_{CuO}$ is the molar mass of CuO (=80 g/mol), $M_{Cu2(OH)2CO3}$ is the molar mass of $Cu_2(OH)_2CO_3$ malachite (=222 g/mol).

For solids A1, A2 and A3, the amount of NaOH base is 4% by weight relatively to the total amount of $Cu_2(OH)_2CO_3$ introduced.

For solids A4 and A5, deionised water is used as the aqueous solution for step b) of kneading. During the extrusion, the pressure varies between 50 and 150 bar depending on the formulation used.

The formulations of solids A1, A2, A3, A4 and A5 are given in Table 1.

TABLE 1

| Designation | CuO/(CuO + Cu$_2$(OH)$_2$CO$_3$) ratio, introduced in step a) | % oxides after LOI | Binder | Peptisation | Calcination temperature (° C.)/ duration (h) | Test for capturing H$_2$S: Sulphur captured at tp (g S/g solid) | EGG (daN · mm$^{-1}$) |
|---|---|---|---|---|---|---|---|
| Solid A1 | 0 | 80% | Bentonite | 4% NaOH | 140° C./1 h | 0.22 | 0.5 |
| Solid A2 | 0 | 80% | Bentonite | 4% NaOH | 250° C./1 h | 0.25 | 0.5 |

TABLE 1-continued

| Designation | CuO/(CuO + Cu$_2$(OH)$_2$CO$_3$) ratio, introduced in step a) | % oxides after LOI | Binder | Peptisation | Calcination temperature (° C.)/ duration (h) | Test for capturing H$_2$S: Sulphur captured at tp (g S/g solid) | EGG (daN · mm$^{-1}$) |
|---|---|---|---|---|---|---|---|
| Solid A3 | 0 | 80% | Bentonite | 4% NaOH | 350° C./1 h | 0.24 | 0.5 |
| Solid A4 | 0 | 80% | Bentonite | water | 250° C./1 h | 0.26 | 0.3 |
| Solid A5 | 0 | 60% | Bentonite | water | 250° C./1 h | 0.16 | 0.6 |

The mechanical strength of the extrudates is determined by a grain by grain crushing test (EGG) as previously described.

The mechanical strength of solids A1 to A5 is too low taking into consideration the constraints associated with an industrial use. The EGG values measured are lower than 0.7 daN·mm$^{-1}$, whatever the calcination temperature and the presence or lack of sodium hydroxide during peptization.

The increase in binder content and the decrease in malachite content in solid A5 results in a slight increase in mechanical strength which is nevertheless insufficient, to the detriment of the sulphur capture capacity thereof. In this latter case, the sulphur capacity becomes weak compared to that of the solids according to the invention.

Example 2: According to the Invention

In example 2, the solids referenced as B1 to B4 according to the invention are prepared by kneading and extruding according to the following procedure:
a) mixing a set of compounds comprising a Cu$_2$(OH)$_2$CO$_3$ powder, a CuO powder, and a binder;

$$\% \text{ weight CuO after } LOI = \frac{m_{CuO} + \frac{2 \cdot M_{CuO}}{M_{Cu_2(OH)_2CO_3}} \cdot m_{Cu_2(OH)_2CO_3}}{m_{binder} + m_{CuO} + \frac{2 \cdot M_{CuO}}{M_{Cu_2(OH)_2CO_3}} \cdot m_{Cu_2(OH)_2CO_3}}$$

Where $m_{CuO}$ is the mass of CuO initially introduced in step a) in the form of CuO powder, $m_{binder}$ is the mass of the binder introduced in step a), $M_{Cu2(OH)2CO3}$ is the malachite Cu$_2$(OH)$_2$CO$_3$ mass introduced in step a), $M_{CuO}$ is the molar mass of CuO (=80 g/mol), $M_{Cu2(OH)2CO3}$ is the molar mass of malachite Cu$_2$(OH)$_2$CO$_3$ (=222 g/mol).

For solid B1, the amount of NaOH base is 4 wt % relatively to the total amounts of Cu$_2$(OH)$_2$CO$_3$ and CuO introduced.

For solids B2, B3 and B4, deionised water is used as the aqueous solution for step b) of kneading. During the extrusion, the pressure varies between 50 and 200 bar depending on the formulation used.

The formulations of the solids are given in Table 2.

TABLE 2

| Designation | CuO/(CuO + Cu$_2$(OH)$_2$CO$_3$) ratio, introduced in step a) | % oxydes after LOI | Binder | Peptization | Calcination temperature (° C.)/ duration (h) | Test for capturing H$_2$S: Sulphur captured at tp (g S/g solid) | EGG (daN · mm$^{-1}$) |
|---|---|---|---|---|---|---|---|
| Solid B1 | 0.5 | 80% | Bentonite | 4% NaOH | 350° C./1 h | 0.2 | 1.8 |
| Solid B2 | 0.5 | 80% | Bentonite | water | 350° C./1 h | 0.23 | 1.4 |
| Solid B3 | 0.5 | 80% | Bentonite | water | 250° C./1 h | 0.22 | 1.2 |
| Solid B4 | 0.2 | 80% | Bentonite | water | 350° C./1 h | 0.27 | 1.0 | b) contacting the mixture of step a) with an aqueous solution (peptization) and kneading the paste thus obtained in a Z-arm mixer for 30 minutes with an arm rotation speed of 25 rotations·minutes$^{-1}$;
c) extruding the paste kneaded in step b) by means of a piston extruder, with a diameter of 3 mm and a length of 5 to 10 mm at a variable pressure depending on the solids;
d) calcinating the extrudates at a variable temperature depending on the examples, carried out for 1 hour, under air flow.

A bentonite clay was used as a binder.

The CuO content or mass percentage of oxides (oxide+CuO content, CuO from the decomposition of malachite) after loss on ignition (550° C. for 2 hours) is 80 wt % for solids B1 to B4. This content is determined according to the following equation:

The combined use of CuO and Cu$_2$(OH)$_2$CO$_3$ in the preparation method according to the invention makes it possible to obtain solids having satisfactory mechanical properties (EGG greater than 0.7 daN·mm$^{-1}$). Furthermore, the solids have satisfactory sulphurisation capacities, greater than 0.15 grams of sulphur/gram of solid in the test conditions described in the document.

Example 3: According to the Invention

In example 3, the solids referenced as C1 and C2 according to the invention are prepared by kneading and extruding according to the following procedure:
a) mixing a set of compounds comprising a Cu$_2$(OH)$_2$CO$_3$ powder, a ZnO powder, and a binder;
b) contacting the mixture of step a) with an aqueous solution (peptization) and kneading the paste thus obtained in a Z-arm mixer for 30 minutes with an arm rotation speed of 25 rotations·minutes$^{-1}$;

c) extruding the paste kneaded in step b) by means of a piston extruder, with a diameter of 3 mm and a length of 5 to 10 mm at a variable pressure depending on the solids;

d) calcinating the extrudates at a variable temperature depending on the examples, carried out for 1 hour, under air flow.

A bentonite clay was used as a binder.

The CuO+ZnO content or mass percentage of oxides (oxide+CuO content, CuO from the decomposition of malachite) after loss on ignition (550° C. for 2 hours) is 80 wt % for solids C1 and C2. This contest is determined according to the following:

$$\% \text{ weight oxides after } LOI = \frac{m_{ZnO} + \frac{2 \cdot M_{CuO}}{M_{Cu_2(OH)_2CO_3}} \cdot m_{Cu_2(OH)_2CO_3}}{m_{binder} + m_{ZnO} + \frac{2 \cdot M_{CuO}}{M_{Cu_2(OH)_2CO_3}} \cdot m_{Cu_2(OH)_2CO_3}}$$

Where $m_{ZnO}$ is the mass of ZnO initially introduced in step a) in the form of ZnO powder, $m_{binder}$ is the mass of the binder introduced in step a), $M_{Cu2(OH)2CO3}$ is the malachite $Cu_2(OH)_2CO_3$ mass introduced in step a), $M_{CuO}$ is the molar mass of CuO (=80 g/mol), $M_{Cu2(OH)2CO3}$ is the molar mass of malachite $Cu_2(OH)_2CO_3$ (=222 g/mol).

For solids C1 and C2, the amount of NaOH base is 4 wt % relatively to the total amounts of $Cu_2(OH)_2CO_3$ and CuO introduced.

During the extrusion, the pressure varies between 50 and 150 bar depending on the formulation used.

The formulations of the solids are given in Table 3.

Example 4: According to the Invention

Example 4 shows the capture performances of solid B3 according to the invention, the preparation of which is described in example 2.

The performances of capturing diverse impurities have been determined according to the protocol for measuring the impurity capture capacity by the prepared solids, described above.

The capacities of capture of the following sulphur compounds $H_2S$, $CH_3SH$, $C_2H_5SH$, as well as the capture of carbon monoxide CO have been evaluated in the test conditions described in the protocol.

The results of the tests are presented in Table 4.

TABLE 4

| Tested solid | Test for capturing $H_2S$: Sulphur captured at tp (g S/g solid) | Test for capturing $CH_3SH$: Sulphur captured at tp (g S/g solid) | Test for capturing $C_2H_5SH$: Sulphur captured at tp (g S/g solid) | Test for capturing CO: mass of CP captured at tp (g CO/g solid) | EGG (daN · mm$^{-1}$) |
|---|---|---|---|---|---|
| Solid B3 | 0.22 | 0.06 | 0.19 | 0.23 | 1.2 |

The results show that the solid B3 obtained from the method according to the invention makes it possible to remove the sulphur compounds $H_2S$, $CH_3SH$, $C_2H_5SH$ contained in the gas, by sequestering sulphur on solid B3 before breakthrough (before $t_p$) in line with the capacities given in Table 4, in test conditions.

Solid B3 is also able to purify a gas containing carbon monoxide by capturing, in the measurement conditions, 0.23 grams of CO per gram of solid before starting to observe the appearance of carbon monoxide at the reactor outlet (i.e. before the breakthrough $t_p$).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for preparing a solid, comprising the steps of:
    a) mixing of a set of compounds comprising at least one malachite $Cu_2(OH)_2CO_3$ powder, at least one metal

TABLE 3

| Designation | ZnO/(ZnO + Cu$_2$(OH)$_2$CO$_3$) ratio, introduced in step a) | % oxydes after LOI | Binder | Peptization | Calcination temperature (° C.)/duration (h) | Test for capturing H$_2$S: Sulphur captured at tp (g S/g solid) | EGG (daN · mm$^{-1}$) |
|---|---|---|---|---|---|---|---|
| Solid C1 | 0.2 | 80% | Bentonite | 4% NaOH | 200° C./1 h | 0.19 | 1.0 |
| Solid C2 | 0.2 | 80% | Bentonite | 4% NaOH | 350° C./1 h | 0.19 | 0.9 |

The combined use of ZnO and $Cu_2(OH)_2CO_3$ in the preparation method according to the invention makes it possible to obtain solids having satisfactory mechanical properties (EGG greater than 0.7 daN·mm$^{-1}$). Furthermore, the solids have satisfactory sulphurisation capacities, greater than 0.15 grams of sulphur/gram of solid in the test conditions described in the document.

oxide powder selected from the group consisting of copper, zinc, iron, manganese and mixtures thereof, and at least one binder, thereby forming a mixture;

b) contacting the mixture of step a) with an aqueous solution to obtain a paste and kneading the paste;

c) extruding the paste kneaded in step b) at a pressure of between 3 and 25 MPa thereby obtaining extrudates; and d) calcinating the extrudates at a temperature between 140° C. and 500° C. and for a duration between 10 minutes and 6 hours under a gaseous flow comprising oxygen;

wherein when the at least one metal oxide powder included in said set of compounds of said step a) is copper oxide, said set of compounds is free from zinc oxide, wherein the solid exhibits an EGG (grain by grain crushing test) value greater than 0.7 daN·mm$^{-1}$ and a sulfur capture capacity greater than 0.16 grams of sulfur/gram of solid, wherein the EGG value described by American Society for Testing and Materials (ASTM) D 6175-3 method, and wherein the sulfur capture capacity is determined by a test carried out at a temperature of 50° C., at a pressure of 0.3 MPa, and with an hourly volume velocity of 1530 h$^{-1}$, a gas used for the test contains 0.9 vol % $H_2S$ in nitrogen, and a content of $H_2S$ present in an outlet gas from a reactor by gas chromatography.

2. The method for preparing a solid according to claim 1, wherein the extrudates obtained from step c) are dried at a temperature between 70 and 160° C. for a duration between 1 and 24 hours before being calcinated in step d).

3. The method for preparing a solid according to claim 1, wherein a content of said at least one metal oxide powder expressed as a ratio of a mass of said at least one metal oxide powder introduced into the set of compounds mixed in step a) to a total mass of the at least one malachite $Cu_2(OH)_2CO_3$ powder and said at least one metal oxide powder introduced into the set of compounds mixed in step a) is between 0.01 and 1.

4. The method for preparing a solid according to claim 1, wherein said at least one malachite $Cu_2(OH)_2CO_3$ powder has a bimodal distribution.

5. The method for preparing a solid according to claim 4, wherein said at least one malachite $Cu_2(OH)_2CO_3$ powder comprises 0.1 to 99.9 wt % of malachite particles with a $D_{50}$ between 1 and 15 μm, and 99.9 to 0.1 wt % of malachite particles with a $D_{50}$ between 25 and 100 μm, the weight percentage being expressed relative to a total weight of said at least one malachite $Cu_2(OH)_2CO_3$ powder.

6. The method for preparing a solid according to claim 1, wherein the solid exhibits the EGG value between 0.9 and 1.8 daN·mm$^{-1}$ and the sulfur capture capacity between 0.19 and 0.27 grams of sulfur/gram of solid.

7. The method for preparing a solid according to claim 1, wherein said aqueous solution of step b) contains an acid or base peptizing agent.

8. The method for preparing a solid according to claim 7, wherein said aqueous solution contains nitric acid, with a ratio of mass of $HNO_3$ mass to mass of said at least one metallic oxide powder is between 0.5 and 10.

9. The method for preparing a solid according to claim 7, wherein said basic peptizing agent is selected from the group consisting of sodium hydroxide, potassium hydroxide, aqueous ammonia, tetraethylammonium hydroxide, ammonium carbonate and mixtures thereof, and a ratio of the basic peptizing agent to mass of said at least one metal oxide powder is between 1 and 10.

10. The method for preparing a solid according to claim 1, wherein the aqueous solution of step b) is deionized water.

11. The method for preparing a solid according to claim 1, wherein step d) of calcination is carried out at a temperature between 200° C. and 500° C.

12. The method for preparing a solid according to claim 1, wherein the at least one binder is a bentonite clay.

13. The method for preparing a solid according to claim 1, wherein the prepared solid has a content of the at least one binder between 15 wt % and 25 wt % of the solid.

14. The method for preparing a solid according to claim 1, wherein the at least one binder is a kaolinite mineral, a palygorskite mineral, a smectite clay mineral, alumina, a precursor of alumina, silica or a mixture thereof.

15. The method for preparing a solid according to claim 1, wherein said at least one metal oxide powder included in the set of compounds of the said step a) is zinc oxide, and said set of compounds being free of copper oxide.

* * * * *